United States Patent
Kanamori et al.

(10) Patent No.: US 7,184,654 B2
(45) Date of Patent: Feb. 27, 2007

(54) SEMICONDUCTOR DEVICE CONTROL APPARATUS AND METHOD

(75) Inventors: Atsushi Kanamori, Nukata-gun (JP); Satoshi Yoshimura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/290,490

(22) Filed: Dec. 1, 2005

(65) Prior Publication Data
US 2006/0165392 A1    Jul. 27, 2006

(30) Foreign Application Priority Data
Jan. 24, 2005    (JP) .............................. 2005-015645

(51) Int. Cl.
*H02P 7/285* (2006.01)
*H02P 7/29* (2006.01)

(52) U.S. Cl. ...................... 388/809; 388/811; 388/814; 388/828; 388/829; 388/832; 318/254; 318/439; 318/811; 318/599

(58) Field of Classification Search .................. None
See application file for complete search history.

(56) References Cited

U.S. PATENT DOCUMENTS

| | | | | |
|---|---|---|---|---|
| 5,457,766 A | * | 10/1995 | Ko | .............................. 388/831 |
| 5,825,972 A | * | 10/1998 | Brown | ........................ 388/811 |
| 6,762,577 B2 | * | 7/2004 | Gray et al. | .................. 318/268 |
| 6,778,938 B1 | * | 8/2004 | Ng et al. | ..................... 702/147 |
| 7,030,584 B1 | * | 4/2006 | Alberkrack | .................. 318/439 |
| 7,038,415 B2 | * | 5/2006 | Nakamura et al. | ........... 318/471 |
| 2003/0011332 A1 | * | 1/2003 | Mays, II | ...................... 318/254 |
| 2003/0090229 A1 | * | 5/2003 | Gray et al. | .................. 318/599 |
| 2006/0076912 A1 | * | 4/2006 | Yang et al. | .................. 318/254 |
| 2006/0097677 A1 | * | 5/2006 | Brannen et al. | ............. 318/439 |
| 2006/0097678 A1 | * | 5/2006 | Alberkrack et al. | ......... 318/439 |

FOREIGN PATENT DOCUMENTS

| JP | A-2002-142494 | 5/2002 |
|---|---|---|
| JP | A-2005-73104 | 3/2005 |

* cited by examiner

*Primary Examiner*—Lincoln Donovan
*Assistant Examiner*—Eduardo Colon Santana
(74) *Attorney, Agent, or Firm*—Posz Law Group, PLC

(57) ABSTRACT

In a control apparatus for a motor, which rotates a fan, a semiconductor device is connected to the motor in series to drive the motor. An analog driver circuit drives the semiconductor device with an analog voltage. A PWM control circuit drives the semiconductor device with a PWM signal of a frequency of less than several tens. A switching control circuit selects the analog driver circuit and the PWM control circuit when the motor is to be rotated at speeds lower and higher than a predetermined speed, respectively.

15 Claims, 5 Drawing Sheets

SEMICONDUCTOR DEVICE CONTROL APPARATUS AND METHOD

CROSS REFERENCE TO RELATED APPLICATION

This application is based on and incorporates herein by reference Japanese patent application No. 2005-15645 filed on Jan. 24, 2005.

FIELD OF THE INVENTION

The present invention relates to a semiconductor device control apparatus and method, which may be used for, for instance, driving a fan motor of a fan.

BACKGROUND OF THE INVENTION

A conventional semiconductor device control apparatus is used for controlling various motors. One example is a motor driving control apparatus 1 shown in FIG. 5. In this control apparatus 1, an input signal processing circuit 3 receives a rotation speed command signal in the form of a pulse-width-modulated (PWM) signal from an electronic control unit (ECU) 2 and converts it to a voltage signal corresponding to the duty of the PWM signal. This voltage signal is applied to a PWM control circuit 4. A correction command signal is also applied from a power source voltage correction circuit 5. The ECU 2 receives, for instance, an output signal of a coolant temperature sensor (not shown), which detects coolant temperatures in a radiator, and outputs the rotation speed command signal in accordance with the detected coolant temperature.

A PWM signal generation circuit 6 generates a PWM control command signal based on the voltage signal and the correction command signal. A triangular signal generation circuit 7 generates a triangular signal (carrier wave) in the form of a triangular shape at a fixed frequency (e.g., 19 kHz). The circuit 6 compares the PWM control command signal with the triangular signal by its comparator (not shown) to produce a resultant PWM signal. A driver circuit 8 receives this PWM signal and applies a driving signal to the gate of a N-channel MOSFET 9 in accordance with the PWM signal.

A series circuit of the FET 9 and a motor 11 is connected in parallel to a battery 10 mounted on a vehicle. The FET 9 is on the ground side and hence the apparatus 1 is constructed as a low side driving system. The motor 11 is used to drive a fan 11*a* of a radiator (not shown). The motor 11 is connected between terminals 1*a* and 1*b*. A noise filter 12 is constructed with a coil 12*a* and capacitors 12*b* and 12*c* as a π-type filter. The correction circuit 5 is connected to the terminal 1*b*, that is, the drain of the FET 9 to be responsive to a terminal voltage of the motor 11. Thus, the correction circuit 5 produces the correction command signal, which is varied with variations in a voltage of the battery 10.

A diode 13 is connected between the drain of the FET 9 and the input side of the noise filter 12. This diode 13 provides a path to allow a delay current to flow the battery side when the FET 9 turns off. The FET 9 generates noise signals when it repetitively turns on and off in response the PWM signal of 19 kHz. The noise filter 12 restricts those noise signals from being applied to the battery side.

The carrier wave frequency of the PWM signal is set to 19 kHz, which is near the upper limit of the audible frequency range, so that the sounds generated when the motor 11 is PWM-controlled become offensive to ears. For this reason, the noise filter 12 is necessitated for countering to the switching noises. Since the coil 12*a* as well as the capacitors 12*b* and 12*c* are large in size, the noise filter 12 occupies a considerably large mounting space. Further, since the switching frequency of the FET 9 is high, switching loss is large and heat generation of the FET 9 is large requiring a large heat sink. Thus, the apparatus 1 becomes large in size in the end.

For countering to this drawback, JP P2002-142494A proposes to set the carrier wave frequency of the PWM signal for driving the fan motor 11 to a very low frequency, which may be less than several tens (Hz). With this proposed very low frequency, hissing sound generated when a fan 11*a* rotates is reduced. On the contrary, vibration sound is remarkably increased due to very low speed rotations of the fan 11*a* and becomes offensive to ears.

In place of the PWM control, as shown in FIG. 6, the fan motor 11 may be driven with analog voltages by a control apparatus 14. This apparatus 14 includes an analog driver circuit 15 to control the analog voltage applied to the fan motor 11. The analog driver circuit 15 generates the gate voltage for the FET 9 by regulating the voltage signal applied from the input processing circuit 3 to a level suitable to driver the FET 9. No noise filter nor diode is provided in the control apparatus 14. Since the FET 9 is driven to operate in a linear region (unsaturated region) and a current continuously flows through the FET 9 during the motor control period, the heat generation by the FET 9 is large and a large heat sink is necessitated.

SUMMARY

It is therefore an object to provide a semiconductor device control apparatus and method, which does not necessitate a noise filter or a large heat sink.

A semiconductor device control apparatus is for a motor, which rotates a fan. In this apparatus, a semiconductor device is connected to the motor in series to drive the motor. An analog driver circuit drives the semiconductor device with an analog voltage. A PWM control circuit drives the semiconductor device with a PWM signal of a frequency of less than several tens. A switching control circuit selects the analog driver circuit and the PWM control circuit when the motor is to be rotated at speeds lower and higher than a predetermined speed, respectively. As a result, the vibration sound of the motor is suppressed by driving the motor with the analog voltage at low rotation speeds. Further, the vibration sound of the motor is masked by the hissing sound of the fan by driving the motor with the low frequency PWM signal at high rotation speeds.

BRIEF DESCRIPTION OF THE DRAWINGS

Additional features and advantage of a semiconductor device control apparatus and method will become more apparent from the following detailed description made with reference to the accompanying drawings. In the drawings.

DETAILED DESCRIPTION OF EMBODIMENTS

Figure 1:
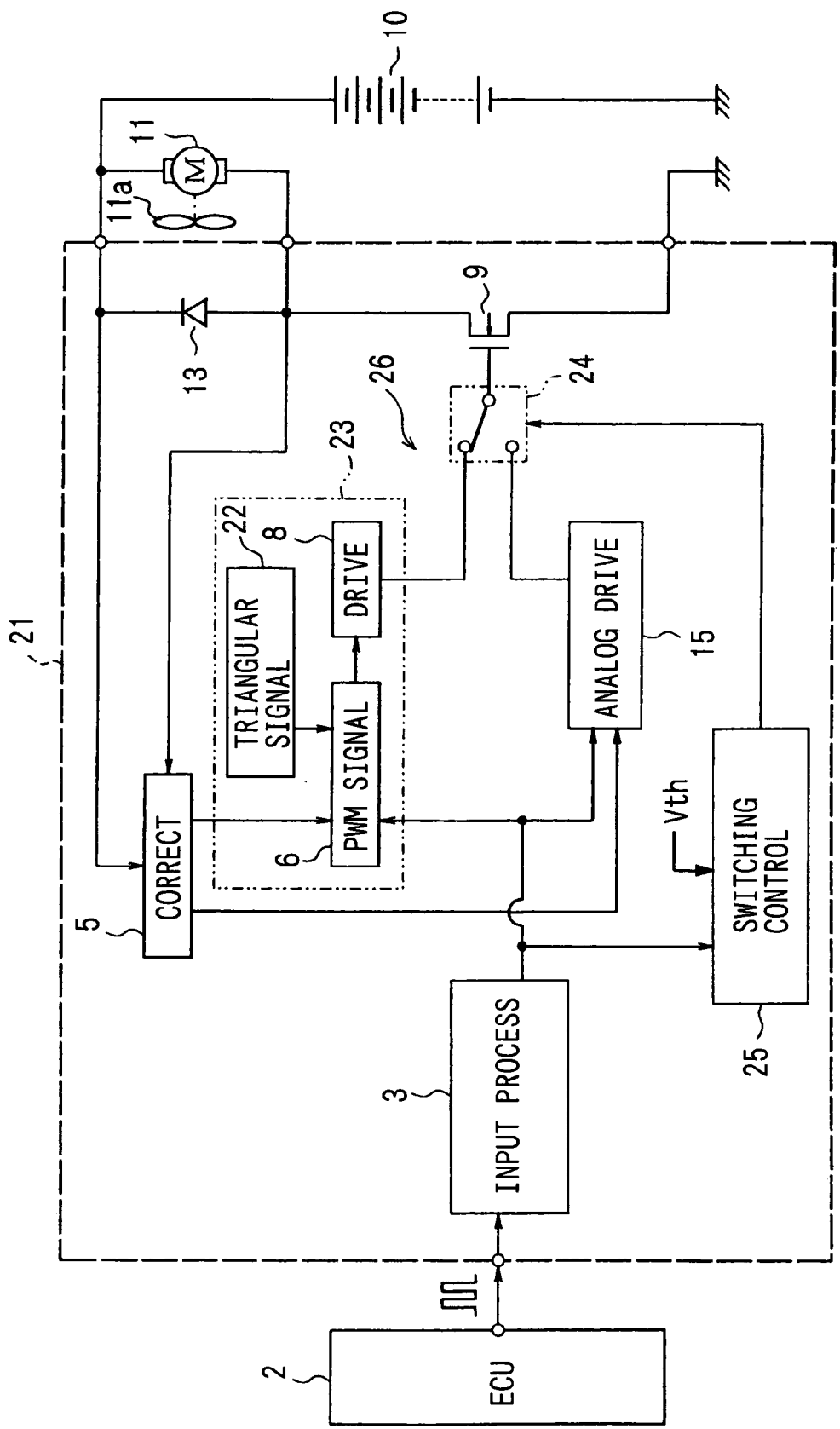
FIG. 1 is an electric circuit diagram showing a vehicle fan motor driving control apparatus as an embodiment of a semiconductor device control apparatus.
Figure 5:
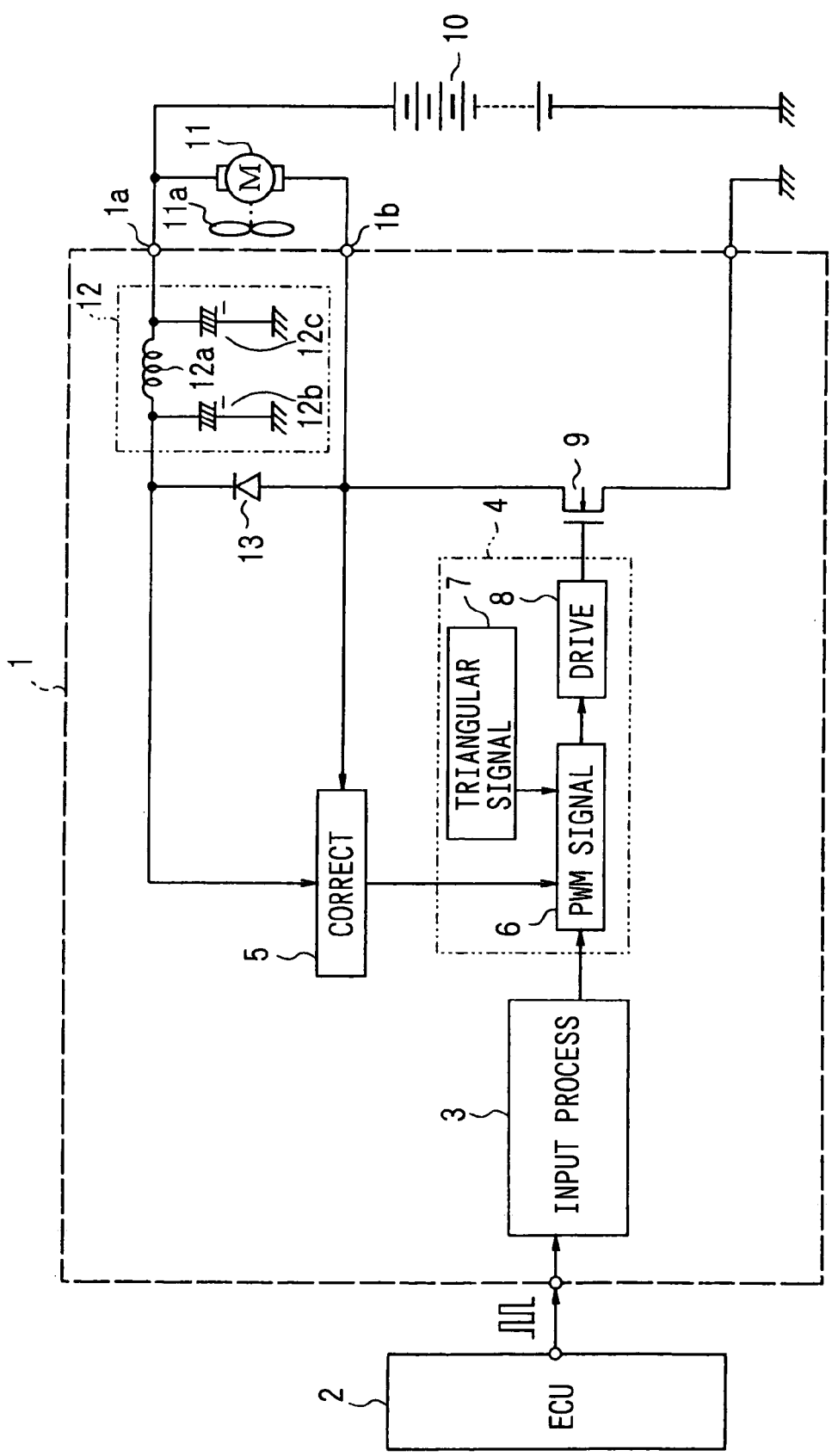
FIG. 5 is an electric circuit diagram showing a conventional vehicle fan motor driving control apparatus.
Figure 6:
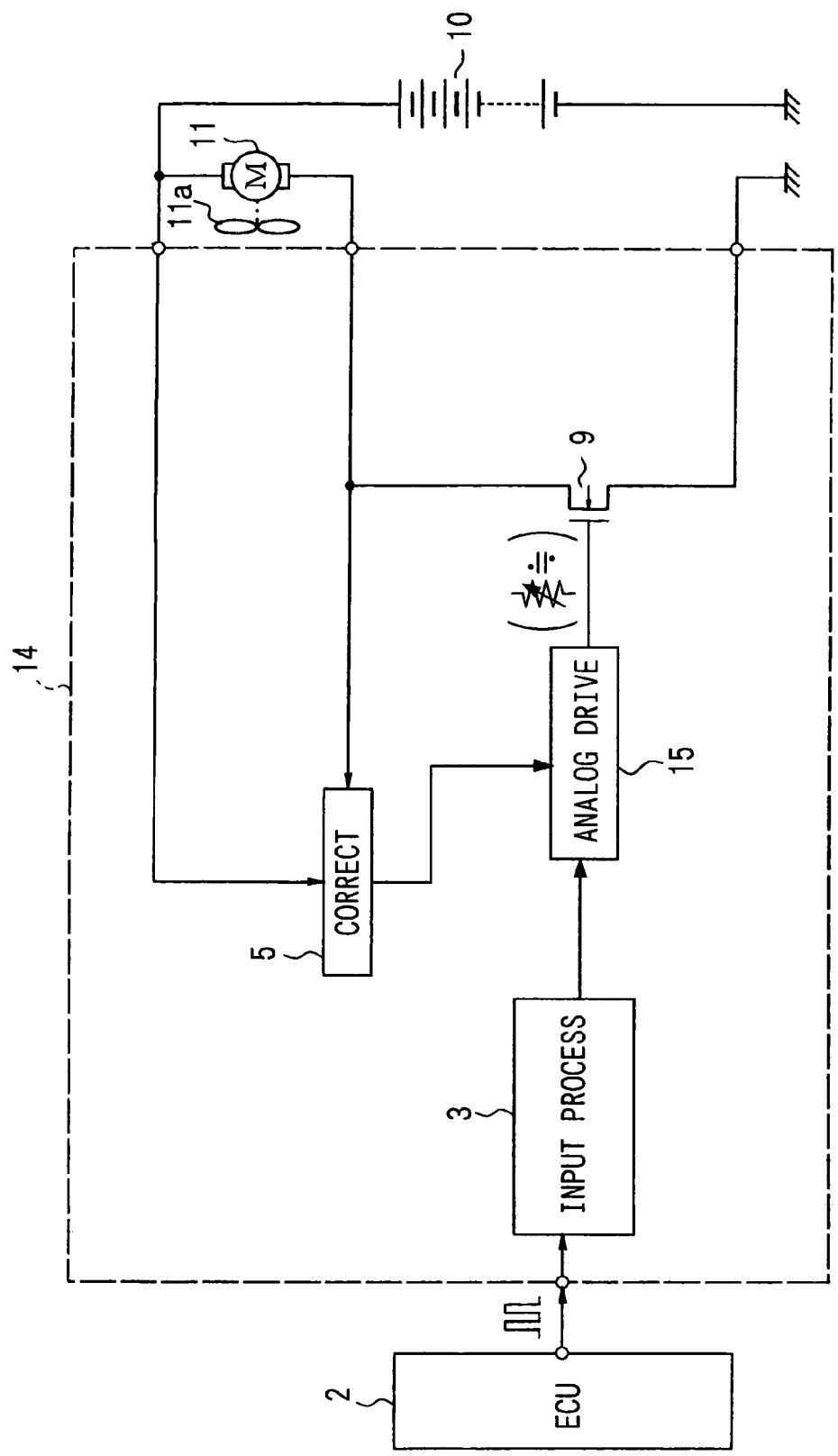
FIG. 6 is an electric circuit diagram showing another conventional vehicle fan motor driving control apparatus.

Referring first to FIG. 1, a vehicle fan motor driving control apparatus 21 is provided as a semiconductor device control apparatus. This control apparatus 21 is similar to the control apparatus 1 shown in FIGS. 5 and 6. Therefore the control apparatus 21 is described with respect to difference from those shown in FIGS. 5 and 6.

In the control apparatus 21, a PWM control circuit 23 has a triangular signal generation circuit 22 in addition to a PWM signal generation circuit 6 and a driver circuit 8. The triangular signal generation circuit 22 generates a triangular signal at a frequency of 50 Hz. A switch 24 is provided to select either a PWM signal produced from the PWM control circuit 23 or an analog control signal produced from an analog driver circuit 15 and applies the selected signal to the gate of a FET 9, which is a semiconductor device. Switching operation of the switch 24 is controlled by a switching control circuit 25 in response to output levels (e.g., 0V to 5V) of a command signal (command voltage) produced from an input signal processing circuit 3.

The switching control circuit 25 may be constructed with a comparator (not shown), which compares the command signal with a threshold level Vth. This threshold level Vth may be 6V. Thus, the switching control circuit 25 drives the switch 24 to connect the FET 9 to the analog driver circuit 15 and the PWM control circuit 23, when the command signal of the input processing circuit 3 is in a low voltage range of 0V to 6V and in a high voltage range over 6V, respectively, with respect to a supply voltage (12V) of the battery 10.

Figure 2:
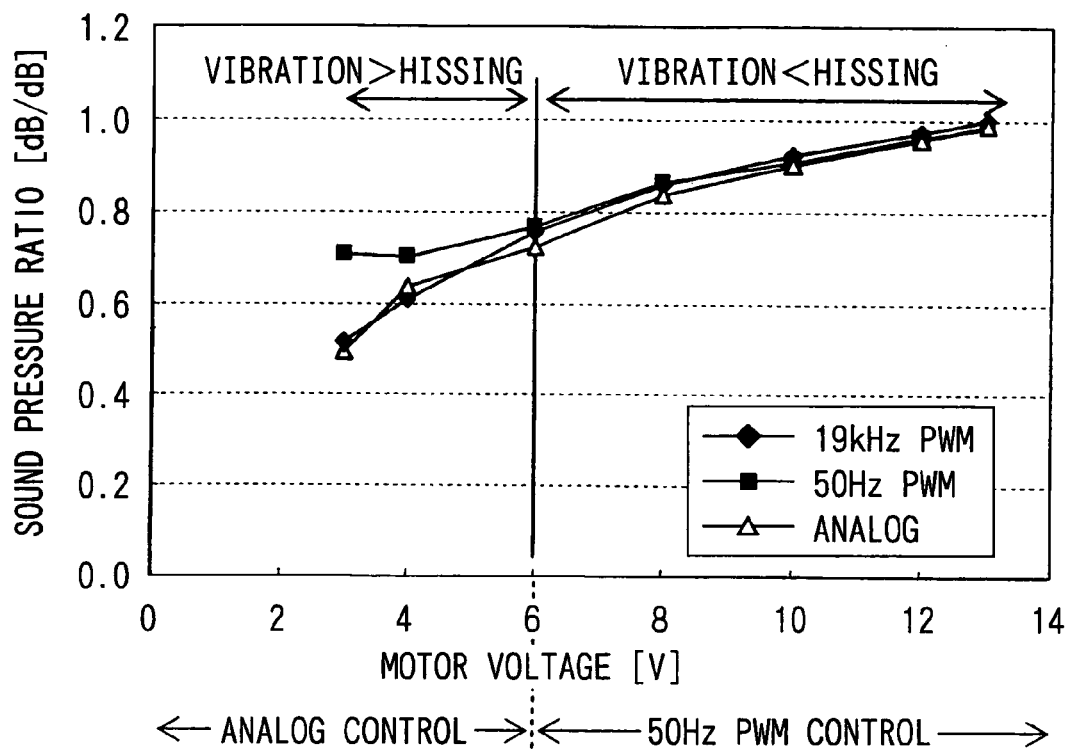
FIG. 2 is a graph showing noise levels of a fan motor in relation to voltages applied to the fan motor.

FIG. 2 shows relations of the sound pressures [dB] of noises generated by the rotation of the motor 11 and the fan 11a relative to the motor voltages [V] with respect to three control methods, that is, 50 Hz PWM control, 19 kHz PWM control and analog voltage (linear and non-PWM) control. In this figure, the sound pressures in the ordinate axis is represented as a ratio of each sound pressure relative to the sound pressure in a reference case in which the voltage applied to the motor 11 is 13V under the 19 kHz PWM control. Each sound pressure is measured in the audible frequency range, that is, 20 Hz to 20 kHz, by using ⅓ octave analysis method.

Figure 3:
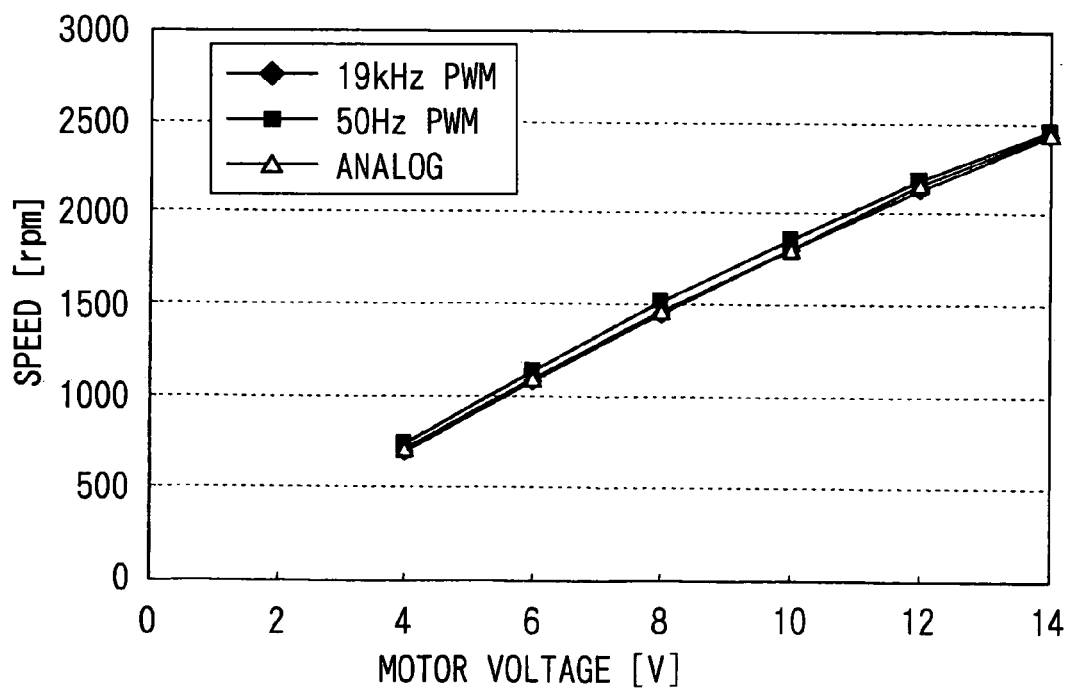
FIG. 3 is a graph showing rotation speeds of a fan motor in relation to voltages applied to the fan motor.

FIG. 3 shows rotation speeds of the motor 11 and the fan 11a in relation to the voltages applied to the motor 11 with respect to the above three control methods. As understood from FIG. 3, the rotation speeds of the motor 11 substantially proportionally changes with the voltage applied thereto. Further, the rotation speeds of the motor 11 do not differ one another among the three different control methods.

As understood from FIG. 2, however, the noise levels do not substantially differ from each other between the 19 kHz PWM control and the analog voltage control over the entire range of the motor voltage, that is, in the range from about 3V to 13V. In the case of the 50 Hz PWM control, the vibration sound becomes larger than in the case of the other two control cases in the range of motor voltage less than a certain voltage, for instance, 6V corresponding to about 1000 rotations per minute (rpm). This difference increases as the motor voltage decreases. Therefore the threshold level Vth of the switching control circuit 25 for switching over the switch 24 is preferably set to 6V, around which the vibration sound of the motor 11 under the low frequency PWM control generally equals the hissing sound of the fan 11a. That is, the threshold level Vth is set to satisfy the following relation:

Hissing sound ≧ motor vibration sound in low frequency PWM control

According to the present embodiment, therefore, the control apparatus 21 drives the motor 11 by the analog voltage control of the analog driver circuit 15 to reduce the vibration sound, when the voltage applied to the motor 11 is in the range from 0V to 6V. The control apparatus 21 drives the motor 11 by the low frequency PWM control of the PWM control circuit 23 to reduce current flow in the FET 9 and the heat generation of the same, when the voltage applied to the motor is 6V. The hissing sound generated by the fan 11a is relatively higher in the motor high rotation speed range. As a result, the vibration sound of the motor 11 will be masked by the hissing sound of the fan 11a even if the motor 11 is driven under the low frequency PWM control.

As described above, the FET 9 is driven by the analog voltage control of the analog driver circuit 15 and the low frequency (e.g., 50 Hz) PWM control of the PWM control circuit 23, when the motor rotation speed command from the outside is lower and higher than the threshold level Vth, respectively. Therefore, the motor vibration sound problem in the low rotation speed range is overcome and the advantage of the low frequency PWM control can be achieved without a noise filter or a large heat sink.

Figure 4:
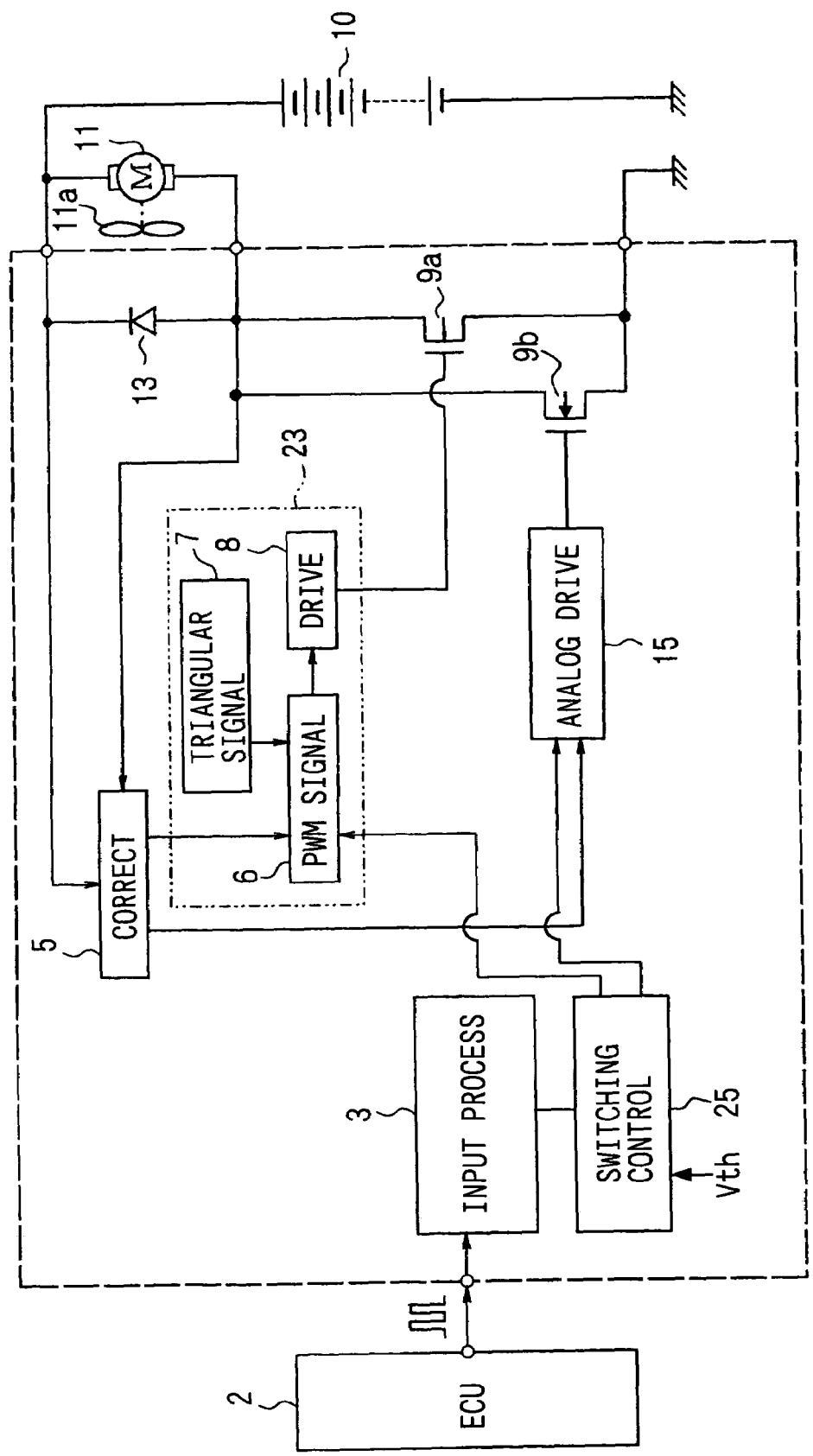
FIG. 4 is an electric circuit diagram showing a vehicle fan motor driving control apparatus as another embodiment of a semiconductor device control apparatus.

The above embodiment may be modified as shown in FIG. 4. In this modified embodiment, FETs 9a and 9b are provided to drive the motor 11 in the low frequency PWM control method and the continuous voltage control method, respectively. Therefore, the switching control circuit 25 is connected to the PWM control circuit 23 for driving the FET 9a and the analog drive circuit 15 for driving the FET 9b.

The above embodiments may be modified in the following ways. The FETs 9, 9a, 9b may be connected at the high potential side of the battery 10. The semiconductor devices 9, 9a, 9b may be P-channel MOSFETs, power transistors or IGBTs. The low frequency PWM control may be implemented with other frequencies which are less than several tens Hz. The threshold level Vth may be varied with design specifications such as rated values of the motor 11 and the fan 11a. A hysteresis may be provided at the switching between the analog voltage control and the low frequency PWM control. The motor 11 may be used to drive various fans other than the radiator fan 11a.

What is claimed is:

1. A control apparatus for a motor, which rotates a fan, the apparatus comprising:
   a semiconductor device connected to the motor in series to drive the motor when turned on;
   an analog driver circuit for continuously driving the semiconductor device with an analog voltage;
   a PWM control circuit for periodically driving the semiconductor device with a PWM signal of a predetermined frequency; and
   a switching control circuit for selecting the analog driver circuit and the PWM control circuit when the motor is to be rotated at speeds lower and higher than a predetermined speed, respectively.

2. The control apparatus as in claim 1, wherein the semiconductor device is a single switching transistor.

3. The control apparatus as in claim 1, wherein the semiconductor device includes two switching transistors selectable by the switching control circuit, one and the other of the switching transistors being driven with the analog voltage and the PWM signal, respectively.

4. The control apparatus as in claim 1, wherein the switching control circuit performs switching of selection with hysteresis.

5. The control apparatus as in claim 1, wherein the predetermined speed is about 1000 rotations per minute.

6. The control apparatus as in claim 5, wherein the predetermined frequency of the PWM signal is about 50 Hz.

7. The control apparatus as in claim 1, wherein the predetermined speed is a speed where a hissing sound of the fan and a vibration sound of the motor generally equal to each other.

8. The control apparatus of claim 1, wherein the predetermined frequency of the PWM signal is less than 100 Hz.

9. A control method for a motor, which rotates a fan, the method comprising:
 comparing a command speed with a predetermined speed;
 driving a semiconductor device connected to the motor in sales with an analog voltage, when the command speed is lower than the predetermined speed; and
 driving the semiconductor device with a PWM signal of a predetermined frequency, when the command speed is higher than the predetermined speed.

10. The control method as in claim 9, wherein the predetermined speed is a speed where a hissing sound of the fan and a vibration sound of the motor generally equal to each other.

11. The control apparatus method as in claim 9, wherein the frequency of the PWM signal is about 50 Hz.

12. The control method as in claim 9, wherein the predetermined frequency of the PWM signal is less than 100 Hz.

13. A control apparatus for a motor, the motor being for operating a fan, the control apparatus comprising:
 an analog diver circuit for generating a continuous analog signal to drive a semiconductor device;
 a pulse-width-modulated (PWM) signal generating circuit for generating a PWM signal at a predetermined low frequency to drive the semiconductor device; and
 a switching control circuit for alternatively selecting one of the analog driver circuit or the PWM signal generating circuit to drive the semiconductor device to thereby drive the motor, wherein the switching control circuit selects the analog driver circuit when the voltage to be applied to the motor is within a first range and selects the PWM signal generating circuit when the voltage to be applied to the motor is within a second range greater than the first range.

14. The control apparatus of claim 13, wherein the switching control circuit comprises a comparator for comparing a commend signal with a threshold voltage, wherein the threshold voltage defines the first and second ranges, wherein the threshold voltage is a value at which a noise generated by the fan is greater than noise generated by rotation of the motor, wherein the switching control circuit selects the PWM signal driver when the command signal is below the threshold voltage.

15. The control apparatus of claim 13, wherein the predetermined low frequency of the PWM signal is less than 100 Hz.

* * * * *